United States Patent

[11] 3,562,615

| | | | | |
|---|---|---|---|---|
| [72] | Inventors | Takuya Nasu<br>Hirakata-shi;<br>Osahiko Yano, Kadoma-shi; Masahiro Deguchi, Yao-shi, Japan | | |
| [21] | Appl. No. | 740,372 | | |
| [22] | Filed | June 26, 1968 | | |
| [45] | Patented | Feb. 9, 1971 | | |
| [73] | Assignee | Matsushita Electric Industrial Co., Ltd.<br>Osaka, Japan<br>a corporation of Japan | | |
| [32] | Priority | June 29, 1967 | | |
| [33] | | Japan | | |
| [31] | | 42/42229 | | |

[54] PHASE CONTROL DEVICE FOR DC MOTOR
8 Claims, 11 Drawing Figs.

[52] U.S. Cl. ................................................ 318/314, 318/345
[51] Int. Cl. ................................................ H02p 5/16, H03d 13/00
[50] Field of Search ................................................ 318/314, 318, 437, 448, 20.370, 20.430, 20.435, 328, 345; 328/133, 134, 155

[56] References Cited
UNITED STATES PATENTS

| | | | |
|---|---|---|---|
| 3,175,159 | 3/1965 | Hall ............................ | 328/155 |
| 2,588,742 | 3/1952 | McCallum .................... | 318/20.370 |
| 3,270,130 | 8/1966 | Hurst et al. ................... | 318/314 |

Primary Examiner—G. R. Simmons
Assistant Examiner—Robert J. Hickey
Attorney—Stevens, Davis, Miller and Mosher ABSTRACT: A device for controlling the rotation of a rotary shaft driven by a DC motor so that the rotary shaft can rotate with a rotational phase which is in synchronism with the phase of a predetermined signal. The device is provided with a speed regulator so that the motor can drive the rotary shaft at approximately the number of revolutions corresponding to the oscillation frequency of the predetermined signal, and a signal representative of the phase difference is applied to the speed regulator so as to positively and steadily drive the motor in phasic synchronism and eliminate the hunting while and after the motor is pulled in.

WHERE
$K_1 = K_c, K_a, K_m, K_k$
$K_2 = K_c, K_f, K_d$

PHASE CONTROL DEVICE FOR DC MOTOR

This invention relates to a phase control device for DC motors.

A variety of devices for controlling the rotational speed of electric motors have hitherto been proposed and put into practical use, and it is a recent tendency that there is growing demand for a control device which can control the rotating state of an electric motor not only in its angular velocity but also in its rotational angle relative to time. A typical example of such a demand is found in the drive of the rotary head in a video tape recorder or in the drive of the rotary drum carrying a copying sheet thereon in a facsimile equipment.

The method of control in which a motor is driven in phase-lock relationship with the phase of a reference signal is commonly called phase control, and a rotary output control device employing a synchronous motor is favorably used for this purpose because it can effect the desired phase control in spite of a relatively simple construction. However, this control device employing therein the synchronous motor has many defects in view of the fact that the starting torque of the motor is low in spite of the large size and the heavy weight, a large amount of heat is generated due to poor efficiency, and a large degree of nonuniformity occurs in the angular velocity during one rotation.

The present invention intends to overcome the defects involved in the prior rotational phase control device described above and contemplates the provision of a phase control device for a DC motor which comprises a rotary output shaft whose rotational phase is to be controlled, a DC motor for driving said rotary output shaft, rotational phase detecting means for detecting the rotational phase of said rotary output shaft, a delay circuit supplied with one of signals including a reference synchronizing signal and an output signal delivered from said rotational phase detecting means and operative in such a manner that the amount of delay is variable depending on a control voltage applied thereto, phase comparator means supplied with the other of said signals including said reference synchronizing signal and said output signal delivered from said rotational phase detecting means and with an output signal delivered from said delay circuit, and a low-pass filter circuit supplied with a phase error signal which is an output signal delivered from said phase comparator means, the output signal delivered from said low-pass filter circuit being negatively fed back to said delay circuit as the signal for controlling the amount of delay in said delay circuit.

It is an object of the present invention to provide a phase control device for a DC motor in which a circuit of simple structure can effect the damping compensation required for the phase control system for the DC motor so as to reduce thereby the hunting of and widen the holding range of synchronism for the motor.

Another object of the present invention is to provide a phase control device of the above character in which means are provided to prevent the speed (phase) of the DC motor from exceeding that of the pull-in range due to vibration occurring when the motor is pulled in, thereby avoiding the pull-in operation from becoming unstable, stabilizing the pull-in of the motor and widening the pull-in range for the motor.

Other objects, features and advantages of the present invention will be readily apparent from the following detailed description of certain preferred embodiments taken in conjunction with the accompanying drawings, in which.

Figure 11:
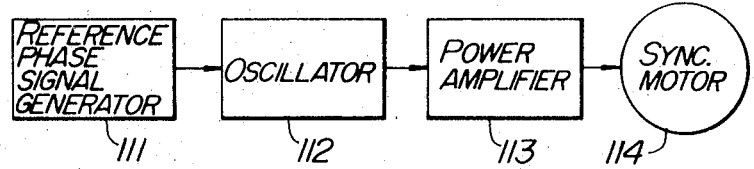
FIG. 11 is a block diagram of a prior art phase control device for an electric motor.

Referring first to FIG. 11, the structure of a prior art phase control device for an electric motor will briefly be described so that the present invention can be understood more clearly. The prior art phase control device comprises a reference phase signal generator 111 whose output is applied to an oscillator 112 in order to control the oscillation phase of the latter. The output of the oscillator 112 is amplified by a power amplifier 113 and drives a synchronous motor 114. As a result, the phase of the synchronous motor 114 can be controlled by the reference phase signal generator 111. Although the phase control device shown in FIG. 11 is preferably used for the purpose because it can effect the desired phase control in spite of a relatively simple construction, it has many defects as pointed out hereinbefore.

Figure 1:
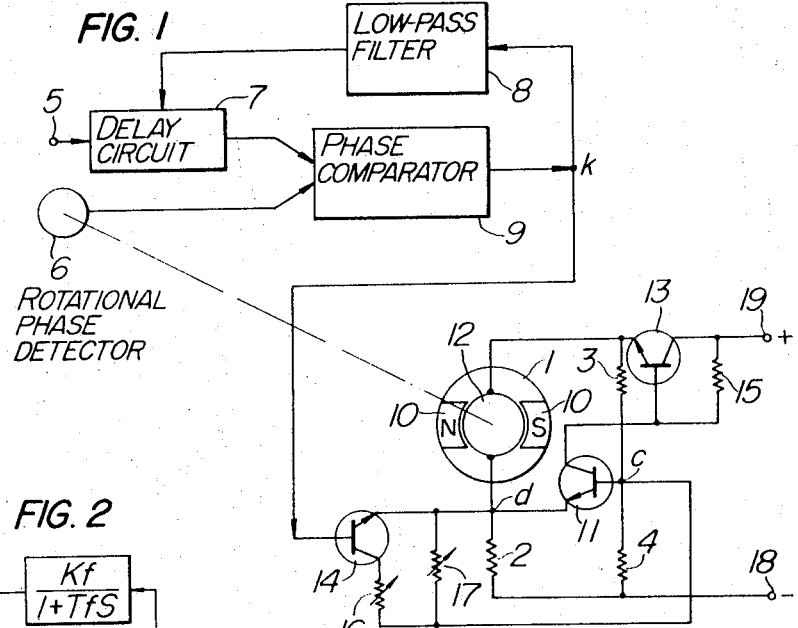
FIG. 1 is a circuit diagram of an embodiment of the phase control device for a DC motor according to the present invention.

The present invention which overcomes the defects involved in the prior art phase control device will now be described in detail with reference to the drawings. Referring to FIG. 1, a DC motor 1 has its field poles 10 formed by a permanent magnet and constitutes a bridge circuit in combination with three resistors 2, 3 and 4. A silicon transistor 11 is connected across detecting terminals $c$ and $d$ of the bridge circuit, with its base connected with the detecting terminal $c$ and its emitter connected with the detecting terminal $d$. The collector of the silicon transistor 11 is connected with the base of a power control transistor 13 and at the same time with a positive terminal 19 of a power supply through a resistor 15. A rotational phase detecting means 6 is connected with the rotary output shaft of the DC motor 1, and a reference synchronizing signal is applied to a terminal 5 of a delay circuit 7 in which the amount of delay is variable depending on a control voltage applied thereto. The output of the delay circuit 7 is applied to a phase comparator means 9, which produces a DC error signal commensurate with the phase difference detected between input signals imparted thereto by a conventional method. The output of the phase comparator means 9 is applied to a low-pass filter circuit 8. The signal output from the low-pass filter circuit 8 is negatively fed to the delay circuit 7 so as to serve as a control signal for controlling the amount of delay. The phase comparator means 9 has its output terminal $k$ connected with the base of a transistor 14. The emitter of the transistor 14 is connected with the detecting terminal $d$ of the bridge circuit, while the collector of the transistor 14 is connected with the detecting terminal $c$ of the bridge circuit through a variable resistor 16. A negative terminal 18 of the power supply is connected with the detecting terminal $d$ through the resistor 2 and with the detecting terminal $c$ through the resistor 4.

Suppose now that $R_a$ is the internal resistance of the armature 12 of the DC motor 1, $R_2$, $R_3$ and $R_4$ are the resistances of the respective resistors 2, 3 and 4, and the bridge balancing condition $$\frac{R_a}{R_2}=\frac{R_3}{R_4}$$

holds between these resistances. Then, a voltage which is proportional to the back electromotive force generated in the armature 12 of the DC motor 1 appears across the detecting terminals $c$ and $d$ of the bridge circuit. Since the amount of the magnetic flux is fixed because of the fact that the field poles 10 are formed by a permanent magnet, the counter electromotive force generated in the armature 12 is substantially solely proportional to the rotational speed of the armature 12 and therefore the voltage detected across the detecting terminals $c$ and $d$ of the bridge circuit is also substantially solely proportional to the rotational speed of the armature 12. The silicon transistor 11 has an additional function of serving as a reference voltage supply since its collector current increases abruptly when the base-to-emitter voltage exceeds about 0.65 volts. When the voltage detected across the terminals $c$ and $d$ of the bridge circuit exceeds 0.65 volts, the collector current of the transistor 11 increases abruptly, so that the voltage drop across the resistor 15 increases abruptly. This results in a higher impedance between the collector and the emitter of the transistor 13 and in a corresponding reduction in the input voltage to the bridge circuit. For this reason, current flowing through the armature 12 is reduced; the rotational speed of the armature 12 is reduced; and the back electromotive force generated in the armature 12 is reduced. The voltage appearing across the detecting terminals $c$ and $d$ of the bridge circuit is reduced and thus the above leads to the balancing state. In case the detecting voltage is lower than 0.65 volts operation opposite to the above is performed and this leads to the balancing state. Thus, the DC motor 1, resistances 2, 3 and 4, transistors 11 and 13, and resistance 15 constitute a speed control system.

In the meantime, the rotational phase detecting means 6 detects the rotational phase of the armature 12 and delivers a signal representing the rotational phase of the armature 12. This signal is applied to the phase comparator means 9 where it is compared with an output signal delivered from the delay circuit 7 in which the extent of delay in the phase of the reference synchronizing signal applied to the terminal 5 is variable depending on the control voltage applied from the low-pass filter circuit 8. A current corresponding to the phase difference between these two signals is supplied to the base of the transistor 14. And, the impedance between the collector and emitter of the transistor 14 cooperates with the variable resistor 16 to act as an attenuator for the voltage appearing across the detecting terminals $c$ and $d$ of the bridge circuit. The voltage appearing across the detecting terminals $c$ and $d$ of the bridge circuit is controlled so as to have a fixed value (actually, so controlled that the base-to-emitter voltage of the transistor 11 has a value in the order of 0.65 volts). Thus when the attenuator consisting of the impedance, that is, the transistor 14 and the variable resistor 16 is connected across the detecting terminals $c$ and $d$ of the bridge circuit to further attenuate the voltage detected by the bridge, the back electromotive force appearing across the detecting terminals $c$ and $d$ is reduced. In order to generate the back electromotive force necessary for balancing with the voltage between the base and emitter of the transistor 11, i.e. 0.65 volts, the rotational speed of the motor 1 is increased. As a result the balancing state is reached at higher rotational speed.

In such a speed control of the bridge detection type, the balancing of the bridge is an important factor which determines the speed-torque characteristic of the motor. In this connection, it will be appreciated that shunting the detecting terminals of the bridge circuit by a resistor as described above is effective so that the balance of the bridge is always ensured and yet the speed of the motor can be varied without adversely affecting the speed-torque characteristic of the motor. In the case in which the output from the rotational phase detecting means 6 is delayed with respect to the output from the delay circuit 7, the phase comparator means 9 delivers a larger output current thereby to increase the base current of the transistor 14 with the result that the impedance between the collector and emitter of the transistor 14 is reduced to accelerate the DC motor 1. Conversely, in the case in which the output from the rotational phase detecting means 6 is advanced with respect to the output from the delay circuit 7, the phase comparator means 9 delivers a smaller output current thereby to decrease the base current of the transistor 14 with the result that the impedance between the collector and emitter of the transistor 14 is increased to decelerate the DC motor 1. In this manner, the rotational phase of the DC motor 1 can be brought into exact synchronism with the phase of the output signal delivered from the delay circuit 7, that is, with the oscillation phase of the reference synchronizing signal applied to the terminal 5 of the delay circuit 7.

In this control system, the speed of the DC motor 1 is variable within a range which corresponds to the frequency range of the signal generated by a reference synchronizing signal generator in order that the desired control can effectively be attained. More precisely, the impedance between the collector and emitter of the transistor 14 is variable between a few hundred kilohms and a few ten ohms since there is a wide range of impedance variation in the transistor 14 from its cutoff state to its full-on state. However, because of the presence of the variable resistor 16, the minimum value of impedance for the detecting terminals $c$ and $d$ of the bridge circuit, hence the maximum value of rotational speed is determined by the variable resistor 16. Further, although the minimum value of rotational speed is determined depending on the design of the bridge circuit, such value can also be set by additionally providing a variable resistor 17.

In FIG. 1, the output signal delivered from the phase comparator means 9 is smoothed out by a low-pass filter circuit 8 and is then applied in the negative feedback fashion to the delay circuit 7 in which the amount of delay is variable depending on a control voltage applied thereto, so that such output signal is used as a control signal to control the amount of delay in the delay circuit 7. These circuits constitute a damping compensation unit.

The fact that these circuits constitute the damping compensation unit will be described in more detail. The transfer function of the DC motor 1 can quite reasonably be approximated by $$\frac{V(s)}{I(s)} = \frac{Km}{1 + TmS} \qquad (I)$$

where, $V(s)$: Laplace transform of the output speed of the DC motor 1;

$I(s)$: Laplace transform of the input current to the DC motor 1;

$Km$: gain constant of the DC motor 1;

$Tm$: time constant of the DC motor 1; and $S$: Laplace operation

The speed control circuit of the bridge detection type (consisting of the resistors 2, 3, 4, the transistors 11, 13 and the resistor 15) is operative to drive the DC motor 1 in the vicinity of the number of revolutions which corresponds to the frequency of the reference synchronizing signal applied to the terminal 5, thereby ensuring the motor rotation in synchronism with the phase of the signal in spite of possible fluctuations in the operating characteristic of the DC motor and in the power supply voltage, etc. Therefore, as far as the transfer function with respect to the phase is concerned, the assembly including the speed control circuit of the bridge detection type, the transistor 14 and the variable resistor 16 may be regarded as a DC amplifier having a gain $Ka$.

Suppose further that the phase comparator means 9 has a gain $Kc$ in its output voltage (current) relative to the phase difference. It will be recalled that the amount of delay taking place in the delay circuit 7 is variable depending on the output voltage delivered from the low-pass filter circuit 8. Suppose then that the rate at which the amount of delay is varied depending on the output voltage delivered from the low-pass filter circuit 8, that is, the gain is $Kd$. Furthermore, the phase $\varphi_0$, that is, the rotational phase of the DC motor 1 detected by the rotational phase detecting means 6 can be obtained by integrating the speed of the motor 1 and can be expressed as $$\frac{\varphi_0(s)}{V(s)} = \frac{Kh}{S} \qquad (II)$$

where, $Kh$ is the coefficient of transform. The low-pass filter circuit 8 is regarded as the time lag of the first order system which is presumed to have a transfer function $\frac{K_f}{1 + T_f S}$ where, $K_f$ is the gain constant and $Tf$ is the time constant.

Figure 2:
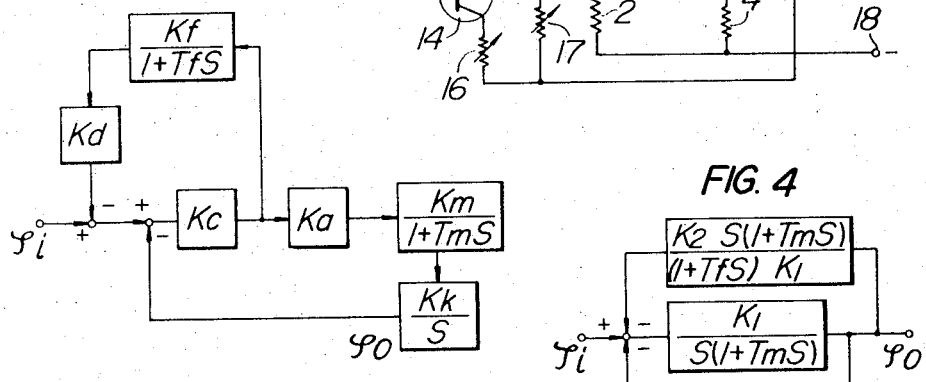
FIGS. 2, 3, 4 and 5 are block diagrams of the phase control device shown in FIG. 1.
Figure 4:
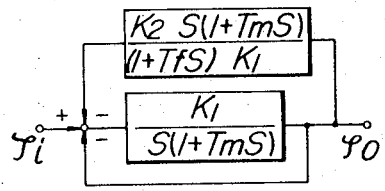
Figure 5:
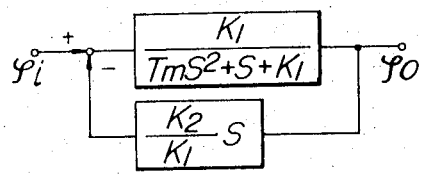
Figure 3:
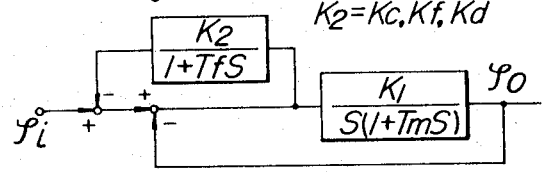

The control system of FIG. 1 including the elements having the respective transfer functions specified above is represented by a block diagram as shown in FIG. 2. It is apparent that the block diagram of FIG. 2 can be further simplified to obtain a block diagram as shown in FIG. 3, where $K_1$ = $K_cK_aK_mK_k$ and $K_2 = K_cK_fK_d$. The system shown in FIG. 3 can equivalently be converted into a form as shown in FIG. 4. From FIG. 4 it will be seen that the term $$\frac{K_2}{1+T_fS} \cdot \frac{S(1+T_mS)}{K_1}$$

is added to the system because of the fact that the error signal derived by phase comparison is fed back to the input side of the system. Suppose in FIG. 4 that $$T_f = 0\, T_m \quad \text{(III)},$$

then, the above term can be expressed as $$\frac{K_2}{1+T_fS} \cdot \frac{S(1+T_mS)}{K_1} = \frac{K_2}{K_1} S \quad \text{(IV)}$$

thus leaving a differential term alone. The block diagram in this case will be as shown in FIG. 5, and it will be seen that the system has a damping compensation effect as is well know in the theory of control.

It will thus be understood that the desired damping compensation unit can simply be constituted by feeding the phase error signal through the low-pass filter circuit 8 back to the input side to which the reference synchronizing signal is applied. The result would not appreciably vary even if the time constant of the low-pass filter circuit 8 does not exactly satisfy the equation (III) but is approximately equal to the value defined in the equation (III). It is thus possible to obtain the desired operating characteristic by suitably determining the time constant of the low-pass filter circuit 8.

Figure 6:
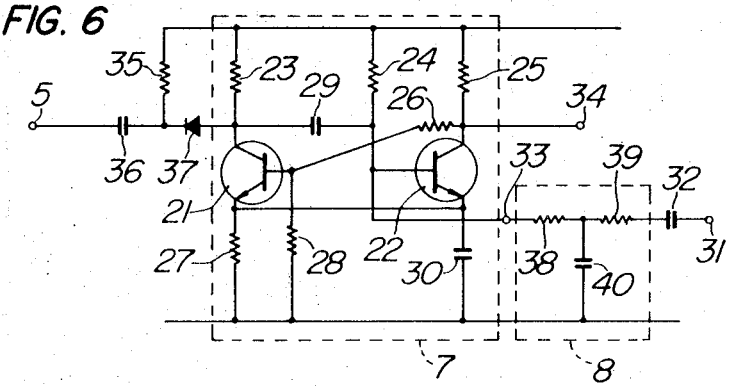
FIG. 6 is a circuit diagram of a delay circuit and a low-pass filter circuit in the phase control device shown in FIG. 1.

FIG. 6 shows one form of the practical circuitry of the delay circuit in which the amount of delay is variable depending on a control voltage applied thereto and the low-pass filter circuit for the realization of the compensation unit described above. The external reference synchronizing signal applied to the terminal 5 provides the input to the delay circuit 7 which is formed by a one-shot multivibrator which comprises transistors 21, 22, resistors 23, 24, 25, 26, 27, 28 and capacitors 29, 30. On the other hand, the phase error signal appearing at a terminal 31 is applied to the low-pass filter circuit 8 after being passed through a capacitor 32 having a proper capacity or is directly applied to the low-pass filter circuit 8. The capacitor 32 should preferably be used when phase drift poses a problem. The low-pass filter circuit 8 has its output terminal 33 connected with the base of one of the transistors 22 forming the one-shot multivibrator. Accordingly, the delay time of the one-shot multivibrator varies depending upon the magnitude of the voltage appearing at the output terminal 33 of the low-pass filter circuit 8, and then, the amount of delay in the delayed equivalent of the external reference synchronizing signal derived from a terminal 34 can easily be varied.

Figure 7:
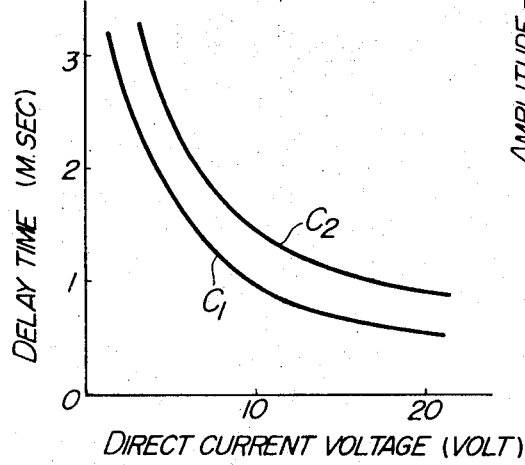
FIG. 7 is a graphic illustration of the operating characteristic of the delay circuit shown in FIG. 6.

FIG. 7 shows the relation between the amount of delay or delay time and the DC voltage applied to the terminal 31 when the DC voltage is directly applied to the low-pass filter circuit 8 without being passed through the capacitor 32. In FIG. 7, the curves $C_1$ and $C_2$ represent the characteristics when the capacity of the capacitor 29 is varied from one value to another.

The low-pass filter circuit 8 is shown as a low-pass filter comprising resistors 38, 39 and a capacitor 40, and the delay circuit 7 is connected with the terminal 5 through a resistor 35, a capacitor 36 and a diode 37. The external reference synchronizing signal, which may be a square wave in this case, is differentiated by the combination of the capacitor 36 and the resistor 35 and is then applied to the one-shot multivibrator (delay circuit 7 through the diode 37. I is needless to say that the resistor 35 is unnecessary when the external reference synchronizing signal is a train of pulses. In the delay circuit 7 described above, the resistor 24 forming part of the one-shot multivibrator may be replaced by a variable resistor so that it can also serve as a means for adjusting the relation between the phase of the external reference synchronizing signal and the rotational phase of the DC motor.

The desired phase control can also be effected without the provision of the damping compensation unit by applying the external reference synchronizing signal directly to the phase comparator means. However, the effect of damping compensation for improving the stability o6 the control system and reducing the undesirable hunting of the motor is to remarkable as to widen the hold range of synchronism, reduce the hunting at the time of pull-in, shorten the time required to pull in the motor, and widen the pull-in range thereby further stabilizing the pull-in operation.

The method of damping compensation described above can be employed in common with the known method using a rate generator and a good result can be expected when it is used in combination with the prior system of speed signal feedback in case such prior system can not exhibit the expected satisfactory effect.

The embodiment described above is quite preferable for a case in which a DC motor of small thickness such as a printed motor is employed, because accessories including a rate generator and associated elements are unnecessary and the feature of the motor of the motor of this kind which resides in its small thickness can fully be utilized to reduce the overall size of the equipment.

Figure 8:
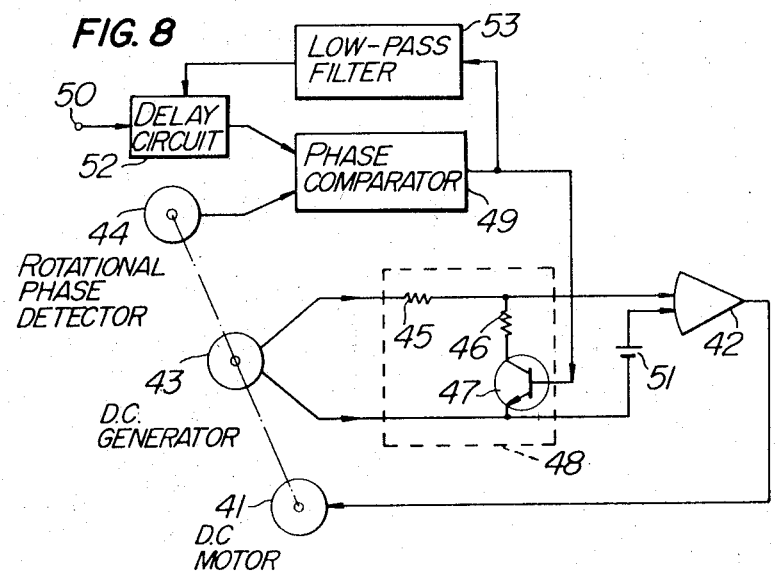
FIGS. 8 and 9 are block diagrams of other embodiments of the phase control device for a DC motor according to the present invention.

Referring to FIG. 8 showing another embodiment of the present invention, a DC motor 41 is driven through a differential type DC amplifier 42, and the rotary output shaft of the DC motor 41 is directly or indirectly connected with a DC rate generator 43 and a rotational phase detecting means 44. The output from the DC generator 43 is supplied to an attenuator 48 consisting of resistors 45, 46 and a transistor 47. The damping factor of the attenuator 48 is controlled by an output signal delivered from a phase comparator means 49. The output from the attenuator 48 is supplied to the differential type DC amplifier 42 together with an output voltage coming from a source of reference voltage supply 51. A reference synchronizing signal appearing at a terminal 50 is applied to a delay circuit 52 in which the amount of delay is variable depending on a control voltage applied thereto. The output signal delivered from the delay circuit 52 is supplied to the phase comparator means 49 together with the output from the rotational phase detecting means 44. The output from the phase comparator means 49 is supplied to the base of the transistor 47 controlling the damping factor of the attenuator 48 and at the same time to a low-pass filter circuit 53. The output from the low-pass filter circuit 53 is supplied to the delay circuit 52 to control the amount of delay in the latter circuit.

The DC motor 41, DC rate generator 43, attenuator 48, differential type DC amplifier 42 and reference voltage supply 51 arranged in the above-described manner constitute a speed control system. More precisely, the voltage generated by the DC rate generator 43 is attenuated by the attenuator 48, and the resultant attenuated voltage derived from the attenuator 48 is applied to the differential type DC amplifier 42 together with the output from the reference voltage supply 51. In the differential type DC amplifier 42, the difference between these voltages is amplified to provide an output which accelerates or decelerates the DC motor 41. In other words, the rotational speed of the DC motor 41 is so controlled that the value of the output voltage delivered from the attenuator 48 becomes very close to the value of the output voltage delivered from the reference voltage supply 51. However, the damping factor of the attenuator 48 is variable depending on the impedance between the collector and emitter of the transistor 47, while the impedance between the collector and emitter of the transistor 47 is variable depending on the base current of the transistor 47. Thus, the damping factor of the attenuator 48 is variable depending on the control signal input to the attenuator 48, that is, the output signal delivered from the phase comparator means 49, and hence, the speed setting provided by the above-described speed control system is variable depending on the control signal input to the attenuator 48. In the meantime, the rotational phase detecting means 44 detects the rotational phase of the DC motor 41 and delivers an output which is representative of the rotational phase of the motor 41. This output is applied together with the output from the delay circuit 52 to the phase comparator means 49 where the phases of these outputs are compared with each other. The delay circuit 52 and the low-pass filter circuit 53 are operative to effect the damping compensation as described hereinbefore and exhibit an effect similar to that described hereinbefore. The delay circuit 52 and the low-pass filter circuit 53 may have a structure as shown in FIG. 6.

Suppose now a case in which the phase detected by the rotational phase detecting means 44 is delayed with respect to the phase of the output signal delivered from the delay circuit 52 which signal is obtained by delaying the reference synchronizing signal. In such a case, an increased output is delivered from the phase comparator means 49 to apply an increased control signal input to the attenuator 48 thereby increasing the damping factor in order to slightly increase the rotational speed and to correct the delay in the phase. When the damping factor is thus increased, the DC motor 41 is accelerated so that a balance can be reached at a further higher generated voltage. Therefore, the delay in the phase is made up and a new state of balance is established. When conversely the phase detected by the rotational phase detecting means 44 is advanced with respect to the phase of the output signal from the delay circuit 52, an operation opposite to the above case takes place to decelerate the DC motor 41 thereby to correct the lead in the phase.

In FIG. 8, the maximum speed at which the DC motor 41 can run is determined by the damping factor of the attenuator 48 when the transistor 47 therein is in its full-on state (the damping factor being about $\frac{R_6}{R_5+R_6}$ where $R_5$ and $R_6$ are the resistances of the respective resistors 45 and 46) and by the voltage of the reference voltage supply 51, while the minimum speed of the DC motor 41 is determined by the impedance between the collector and emitter of the transistor 47 when the transistor 47 is in its cutoff state, by the resistances of the resistors 45 and 46, and by the voltage of the reference voltage supply 51. The purpose of the speed control system is to drive the DC motor always in the vicinity of the number of revolutions corresponding to the frequency of the reference synchronizing signal (which is determined by the number of times of detection for the rotational phase of the DC motor in one revolution) irrespective of such factors as the operating characteristic of the DC motor employed, voltage variation within the operating voltage range of the power supply for driving the DC motor, and the variation in temperatures, and thus to ensure the stable phase control. This is also the same for the speed control circuit of the bridge detection type in FIG. 1. The maximum number of revolutions and the minimum number of revolutions at which the DC motor can run are suitably determined by those factors including the gain of the phase control system, operating characteristic of the DC motor, inertia connected to the motor, load torque, and operating characteristic of the control system.

Figure 9:
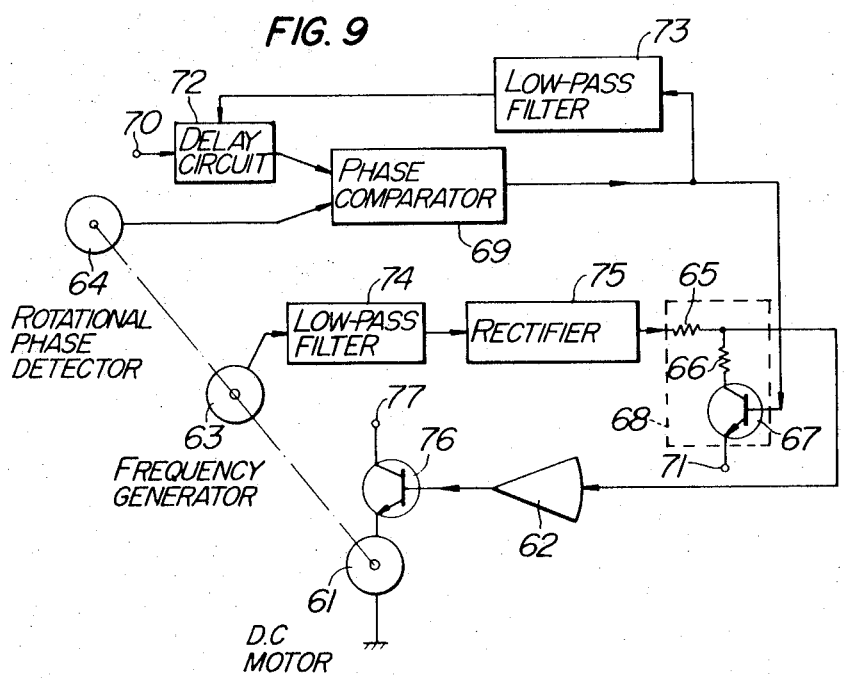

In a further embodiment of the present invention shown in FIG. 9, a DC motor 61 is driven through a control transistor 76 connected in series therewith. The rotary output shaft of the DC motor 61 is directly or indirectly connected with a frequency generator 63 and a rotational phase detecting means 64. The output from the frequency generator 63 is supplied to a low-pass filter circuit 74 which has a cutoff point at a frequency slightly lower than the frequency generated by the frequency generator 63 during the phase control drive for the DC motor 61. The output from the low-pass filter circuit 74 is passed through a rectifier circuit 75 to be applied to an attenuator 68 consisting of resistors 65, 66 and a transistor 67. The damping factor of the attenuator 68 is controlled by an output signal delivered from a phase comparator means 69. The output from the attenuator 68 is supplied to a DC amplifier 62, thence to the control transistor 76 to control the DC motor 61. In the meantime, a reference synchronizing signal appearing at a terminal 70 is applied to a delay circuit 72 in which the amount of delay is variable depending on a control voltage applied thereto as in the preceding embodiments. The output signal delivered from the delay circuit 72 is supplied together with the output from the rotational phase detecting means 64 to the phase comparator means 69. The output from the phase comparator means 69 is supplied to the base of the transistor 67 which controls the damping factor of the attenuator 68 and at the same time to a low-pass filter circuit 73. The output from the low-pass filter circuit 73 is negatively fed back to the delay circuit 72 to control the amount of delay in the delay circuit 72. The delay circuit 72 and the low-pass filter circuit 73 constitute a damping compensation unit as described in detail hereinbefore and exhibit an effect similar to that described hereinbefore. The delay circuit 72 and the low-pass filter circuit 73 may, of course, have a structure as shown in FIG. 6; A DC voltage for driving the DC motor 61 is applied to a terminal 77. A terminal 71 is connected to a source of suitable voltage supply or to the ground.

Figure 10:
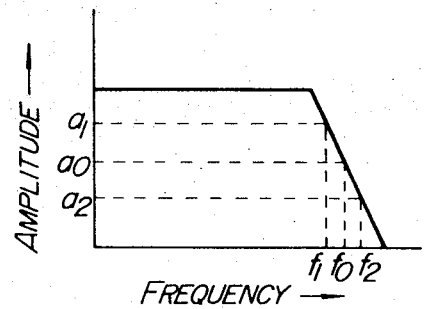
FIG. 10 is a graphic illustration of a low-pass filter circuit in the embodiment shown in FIG. 9.

The DC motor 61, frequency generator 63, low-pass filter circuit 74, rectifier circuit 75, attenuator 68, DC amplifier 62, and control transistor 76 arranged in the manner described above constitutes speed control system. More precisely, the AC signal generated by the frequency generator 63 in proportion to the number of revolutions of the DC motor 61 is supplied to the low-pass filter circuit 74 having an operating characteristic as shown in FIG. 10 so that the AC signal delivered from the low-pass filter circuit 74 has a frequency which lies in the vicinity of the frequency $f_0$ which is generated by the frequency generator 63 in proportion to the number of revolutions of the DC motor 61 when the motor 61 is driven in synchronism with the phase of the reference synchronizing signal. It will be seen that the AC signal has an amplitude which is variable depending on its frequency. The AC output signal delivered from the low-pass filter circuit 74 is supplied to the rectifier circuit 75 where it is converted into a DC voltage corresponding to the number of revolutions of the DC motor 61. This DC voltage is attenuated in the attenuator 68 and appears as a voltage which is continuously balanced with the number of revolutions of the DC motor 61 by the action of the DC amplifier 62 and the control transistor 76 thereby to control the DC motor 61 so that it rotates at the fixed number of revolutions.

It will be noted that the damping factor of the attenuator 68 is variable depending on the impedance between the collector and emitter of the transistor 67, and the impedance between the collector and emitter of the transistor 67 is variable depending on the base current of the transistor 67. Thus, the damping factor of the attenuator 68 is variable depending on the control signal input to the attenuator 68, that is, the output signal delivered from the phase comparator means 69, and hence, the speed setting provided by the above-described speed control system is variable depending on the control signal input to the attenuator 68, that is, the output signal delivered from the phase comparator means 69.

Suppose now a case in which the phase detected by the rotational phase detecting means 64 is delayed with respect to the phase of the output signal delivered from the delay circuit 72 which signal is obtained by delaying the reference synchronizing signal. In such a case, an increased output is delivered from the phase comparator means 69 to apply an increased control signal input to the attenuator 48 thereby increasing the damping factor in order to slightly increase the rotational speed and to correct the delay in the phase. When the damping factor is thus increased, the DC motor 61 is accelerated due to the fact that the input to the DC amplifier 62 is reduced, so that the output voltage delivered from the DC amplifier 62 is increased, and an increased current flows through the control transistor 76 and the DC motor 61. The delay in the phase is thus made up and a state of balance is established. When conversely the phase detected by the rotational phase detecting means 64 is advanced with respect to the phase of the output signal delivered from the delay circuit 72, an operation opposite to the above case takes place to decelerate the DC motor 61 thereby to correct the lead in the phase.

The purpose of the speed control system in the embodiment described above is to drive the DC motor always in the vicinity of the number of revolutions corresponding to the oscillation frequency of the reference synchronizing signal and to ensure the stable drive under phase control. The number of revolutions of a DC motor tends to vary widely depending on such factors as its operating period (service life), power supply voltage, load torque and temperature, and due to its tendency to easily depart from the range in which it can be driven in the phasic synchronism, an extremely unstable phase control usually results. The desired steady phase control can be effected by the speed control system according to the present invention by virtue of the fact that the speed control system can control the number of revolutions of a DC motor so that it can constantly lie within a predetermined range (between the maximum number of revolutions and the minimum number of revolutions) irrespective of variations in such factors as the operating characteristic of the motor, load torque, temperature and voltage.

From the foregoing description it will be understood that damping compensation can easily be effected by the combination of a low-pass filter circuit and a delay circuit in which the amount of delay is variable depending on a control voltage applied thereto. In the present specification, description has been directed, by way of example, to a system in which a reference synchronizing signal is applied to the delay circuit. However, it will readily be understood that similar results can be obtained by applying a signal representative of the rotational phase of the DC motor to the delay circuit, deriving a phase error signal representing the difference between the output signal from the delay circuit and the reference synchronizing signal, smoothing out the error signal by the low-pass filter circuit, and negatively feeding back the smoothed-out signal to the delay circuit to vary the amount of delay.

It will be appreciated that the device according to the present invention is especially suitable for incorporation in portable equipment since it can employ therein a DC motor of small size but having a high starting torque and because such a DC motor develops a high output, operates with a high efficiency, generates little heat and thus does not impart any damage to associated elements.

Although certain embodiments of the present invention have been described from the specific aspect of control of the rotational phase, it will be understood that the speed control system can operate with a remarkably high precision when it employ therein a high-precision reference phase signal generator.

We claim:

1. A phase control device for a DC motor comprising a rotary output shaft whose rotational phase is to be controlled, a DC motor for driving said rotary output shaft, rotational phase detecting means for detecting the rotational phase of said rotary output shaft, a delay circuit which delays a reference synchronizing signal externally applied thereto and whose amount of delay is controlled by a voltage applied thereto, phase comparator means detecting a phase difference between the output signal of said rotational phase detecting means and the output signal of said delay circuit and providing an error signal corresponding to the phase difference, and a low-pass filter circuit supplied with the output signal delivered from said phase comparator means, the output signal delivered from said low-pass filter circuit being negatively fed back to said delay circuit as the signal for controlling the amount of delay thereby accomplishing a damping compensation for said motor.

2. The phase control device of claim 1 further comprising a speed control means for controlling the rotational speed of said DC motor by utilizing the back electromotive force developed in said DC motor.

3. The phase control device of claim 1 further comprising means for generating a signal which is representative of the number of revolutions of said rotary output shaft and means for controlling the rotational speed of said DC motor depending on said signal 4. A phase control device for a DC motor comprising a rotary output shaft whose rotational phase is to be controlled, a DC motor for driving said rotary output shaft, rotational phase detecting means for detecting the rotational phase of said rotary output shaft, a delay circuit which delays the output signal of said rotational phase detecting means and whose amount of delay is controlled by a voltage applied thereto, phase comparator means which detects the phase difference between the output signal of said delay circuit and a reference synchronizing signal externally applied thereto and which provides an error signal corresponding to the phase difference, and a low-pass filter circuit supplied with the output signal delivered from said phase comparator means, the output signal of said low-pass filter circuit being negatively fed back to said delay circuit as the signal for controlling the amount of delay, thus achieving a damping compensation for said motor.

5. The phase control device of claim 4 further comprising a speed control means for controlling the rotational speed of said DC motor by utilizing the back electromotive force developed in said DC motor.

6. The phase control device of claim 4 further comprising a speed control means for controlling the rotational speed of said DC motor by utilizing the back electromotive force developed in said DC motor.

7. A phase control device for a DC motor comprising a rotary output shaft whose rotational phase is to be controlled, a DC motor for driving said output shaft, means forming a bridge circuit including said DC motor in one of its sides, said means being operative to compare a voltage proportional to the rotational speed of said DC motor with a reference voltage for deriving a difference voltage therebetween and to control the passage of current through a power supply control element connected to a power supply circuit for said bridge circuit, rotational phase detecting means for detecting the rotational phase of said rotary output shaft, a delay circuit which delays a reference synchronizing signal externally applied thereto and whose amount of delay is controlled by a voltage applied thereto, phase comparator means detecting a phase difference between the output signal of said rotational phase detecting means and the output signal of said delay circuit and providing an error signal corresponding to the phase difference, a low-pass filter circuit supplied with the output signal delivered from said phase comparator means, the output signal delivered from said low-pass filter being negatively fed back to said delay circuit as the signal for controlling the amount of delay, thereby accomplishing a damping compensation for said motor, and variable impedance means interposed between the detecting terminals of said bridge circuit and operative in response to the output of said phase comparator means to vary the degree of damping for the voltage detected by said bridge circuit.

8. A phase control device for a DC motor comprising a rotary output shaft whose rotational phase is to be controlled, a DC motor for driving said rotary output shaft, means forming a bridge circuit including said DC motor in one of its sides, said means being operative to compare a voltage proportional to the rotational speed of said DC motor with a reference voltage for deriving a difference voltage therebetween and to control the passage of current through a power supply control element connected to a power supply circuit for said bridge circuit, rotational phase detecting means for detecting the rotational phase of said rotary output shaft, a delay circuit which delays the output signal of said rotational phase detecting means, and whose amount of delay is controlled by a voltage applied thereto, phase comparator means which detects the phase difference between the output signal of said delay circuit and a reference synchronizing signal externally applied thereto and which provides an error signal corresponding to the phase difference, a low-pass filter circuit supplied with the output signal delivered for said phase comparator means, the output signal of said low-pass filter circuit being negatively fed back to said delay circuit as the signal for controlling the amount of delay, and variable impedence means interposed between the detecting terminals of said bridge circuit and operative in response to the output of said phase comparator means to vary the degree of damping for the voltage detected by said bridge circuit.